United States Patent Office 2,785,155
Patented Mar. 12, 1957

2,785,155

EXTRACTION OF SOY PROTEIN

Mortimer Louis Anson, New York, N. Y., and Morton Pader, West Englewood, N. J., assignors to Lever Brothers Company, New York, N. Y., a corporation of Maine No Drawing. Application January 11, 1955,
Serial No. 481,278

2 Claims. (Cl. 260—123.5)

The present invention relates to a process for the extraction of protein from soybean meal.

Processes have been proposed by which various proteins are converted by a combination of chemical and physical steps into simulated meats and meat products. One of the steps in one such proposed process comprises heating an adjusted protein-water system to convert the protein to a form in which it will possess the chewy characteristics of meat.

The primary raw material for such purposes is a protein which has been isolated from a protein source, e. g., an oilseed. Because of the nature of the intended use of the ultimate product and because of certain requirements imposed by that process, it is desirable that the isolated protein have certain characteristics in order that it may be processed advantageously into a simulated meat or meat product. For example, the protein which is used in the preparation of such a product must be substantially free of toxic substances; it should possess as high a nutritive value as possible; it should gel readily; and it should be as free as possible from off-flavor and off-color.

In the case of soybean protein, the manner in which the protein is extracted from soybean meal is an extremely important factor which greatly influences both the characteristics of the resultant protein and the degree of completeness of the extraction. Soybean meal is composed of three primary ingredients: protein, insoluble carbohydrate and non-protein, water-soluble materials. The various prior art methods for isolating the protein from the meal have two general steps in common, which are (1) solubilization of the protein by addition of water and of an alkali, acid or salt, and (2) removal of the water-swollen insoluble carbohydrate by mechanical means. From the resultant protein extract the protein can be isolated by precipitation.

In the most common method of extracting a protein from soybean meal, an aqueous suspension of meal in water is raised to a pH over 7 with an alkali such as sodium hydroxide, the alkaline suspension is stirred for approximately an hour, the insoluble residue is separated, and the protein is precipitated from the extract by the addition of sufficient acid to lower the pH to about 5. In this method of isolating protein, it has been found that when essentially complete extraction is obtained certain substances which are responsible for poor flavor and dark color are normally extracted from the oilseed meal along with the protein and appreciable amounts of the undesirable substances remain with the protein even after it is precipitated from the protein extract. In addition, this prior art method of extraction fails to provide a protein which gels readily.

As a specific illustration of the foregoing statement, it has been shown that the sodium hydroxide extraction of the readily extractable protein from soybean meal at a pH of 7.5 to 8.5 provides essentially complete extraction but results in a protein having not only an off-flavor and an off-color but also one which does not gel readily.

Further, in any of the usual methods of extraction, if the conditions of extraction are so modified as to obtain a protein of good quality, the degree of extraction, and hence the yield of protein, becomes relatively low. This is economically undesirable.

In view of the facts hereinabove stated, which show that conventional methods of extracting protein from soybean meal usually result in protein having certain undesirable characteristics or else fail to provide a good yield of protein, it is a primary object of the present invention to provide a process for the extraction of protein from soybean meal which is rapid, leads to the substantially complete recovery of a high quality protein that gels readily and yields a protein product having significantly improved flavor and color, the protein product being high in nutritive value and substantially free from toxic substances.

The process of the present invention is characterized by the extraction of protein from soybean meal at a temperature of about 60° C. in an aqueous solution containing calcium hydroxide at a concentration ranging from about 0.002 molar to about 0.004 molar.

In a preferred embodiment of the invention, the process comprises suspending soybean meal in an aqueous solution of calcium hydroxide of the specified molarity at room temperature and then heating the suspension to a temperature of about 60° C. In this manner, it is possible to obtain more nearly complete extraction than when the meal is added directly to a calcium hydroxide solution held at 60° C.

It is known that calcium hydroxide solutions are useful for extracting protein from soybean meal at room temperature, i. e., about 25° C., a temperature considerably below that employed in the process of this invention. Our process combines a relatively low calcium hydroxide concentration and the moderately high temperature of 60° C. which renders possible the recovery of a protein of high quality with respect to flavor, color and gelling characteristics. It was to be expected from the increase in temperature that the resultant protein would be of poorer quality than that obtained by extracting at lower temperatures. Thus, the high quality of the protein recoverable from the extracts of our process was unforeseen.

The temperature of the extraction is one of the fairly critical features of our process and should be, as stated, about 60° C. It is not intended, however, that the process be limited to this exact temperature since a few degrees lower or higher can be used without loosing the advantages of the process.

For optimum results, the soybean meal utilized as a raw material in the process of the invention should be of good flavor and color and sufficiently clean to be approved as a source of edible material. There are several available commercial grades of soybean flakes which are especially desirable raw materials and which are prepared from dehulled beans and are desolventized with super-heated solvent. The soybean meal should not be overheated, however, since this results in a decrease in the solubility of its protein content. However, any grade of soybean meal can be processed according to the invention with advantage over other known processes.

There are several variables in the process of the invention which influence to some extent the rapidity and degree of the extraction and the quality of the protein extract. One lesser variable is the concentration of meal which is to be suspended in the aqueous calcium hydroxide solution. With respect to this variable, it has been found that concentrations of meal up to about 10% by weight of the aqueous extraction solution are satisfactory in the process of the invention. Generally speaking, however, it is preferred to suspend not more than about 5% by weight of the meal in the solution because, at higher concentrations, the yield of protein tends to decrease.

A more important variable is the concentration of the calcium hydroxide in the extraction solution. This has already been defined as from 0.002 to 0.004 molar and, within this range, the optimum concentration will vary with the quality of the meal that is being treated, the concentration of the meal in suspension in the extraction solution and the pH of the extraction solution. In practicing the invention, therefore, the molarity of the calcium hydroxide solution will be selected from within the above range depending upon the other factors mentioned.

The pH of the extraction is still another variable which is inter-related with the molarity of the calcium hydroxide solution. For best results the pH should be from about 6.7 to about 7.2. In the ordinary case, when operating within the range of calcium hydroxide molarities given above, the pH, provided no other alkaline or acidic materials are added, will fall between about 6.7 and about 7.2. Therefore, in the preferred case no attention need be paid to adjustment of the pH since it is controlled by the molar concentration of the calcium hydroxide. it is preferred, however, that the pH of the extraction be approximately 7.

In operating the process of the invention, as hereinabove described, it is possible to obtain a very rapid extraction of the readily extractable protein in yields greater than 90%. Generally, the time required in order to obtain the maximum yield of protein is in the order of minutes.

After the extraction has progressed to the desired degree, the insoluble materials can be removed from the resulting suspension by any of several conventional means. The preferred method of separating the insoluble materials is centrifugation.

After the insoluble materials have been removed, the resultant protein extract is found to be of unusually high quality. Protein which is substantially free from off-flavor and off-color and which can be caused to gel readily can be isolated from the extract by precipitation with acid.

The isolated protein is exceptionally well suited to the preparation of edible products and is especially satisfactory for the preparation of simulated meat products.

Example

A protein extract was prepared as follows from edible grade soy meal whose nitrogen was practically completely extractable. First, a 5% suspension of soy meal in an aqueous 0.003 M CaO solution was prepared. While the suspension was stirred gently, steam was introduced by means of a sparger until the temperature of the suspension was 60° C. The suspension at a pH of 7 was stirred for 5 minutes while at this temperature. It was then pumped to an efficient centrifuge where practically all of the insoluble matter was removed. The resulting extract contained over 90% of the nitrogen present in the soy meal originally.

The extract, which was at about 50° C., was stirred vigorously, and approximately 3 N HCl was gradually added until the pH of the resulting slurry was lowered to 5.0. This precipitated the protein. The suspension of protein was then pumped to a basket centrifuge where it was collected as a wet cake containing about 20–30% protein. About 97% of the protein present in the extract was precipitated.

Finally, the protein was washed as follows: The protein was suspended in a volume of water approximately equal to that of the extract from which it was precipitated, and the slurry was passed between the rotor and stator of a colloid mill in order to disperse the protein completely. The dispersion, as it was stirred, was then heated to 60° C. by means of steam, and, after it was at 60° for 5 minutes, it was pumped to a basket centrifuge. The protein was collected in the centrifuge as an aqueous white cake containing about 25–30% protein.

The protein thus prepared was substantially free from off-color and off-flavor and, when its pH was adjusted to about 7, it gelled readily.

This is a continuation-in-part of application Serial No. 429,983, filed May 14, 1954.

We claim:

1. A process for the extraction of protein from soybean meal which comprises suspending soybean meal in an aqueous solution containing calcium hydroxide in a concentration ranging from about 0.002 to about 0.004 molar at a temperature of about 60° C., separating insoluble material from the resulting protein extract, adding acid to the extract to precipitate the protein, and separating the protein.

2. A process for the extraction of protein from soybean meal which comprises suspending soybean meal in an aqueous solution containing calcium hydroxide in a concentration ranging from about 0.002 to about 0.004 molar at substantially room temperature and then raising the temperature of the resultant suspension to about 60° C., separating insoluble material from the resulting protein extract, adding acid to the extract to precipitate the protein, and separating the protein.

References Cited in the file of this patent

UNITED STATES PATENTS

| | | |
|---|---|---|
| 1,955,375 | Cone et al. | Apr. 17, 1934 |
| 2,405,438 | Levin | Aug. 6, 1946 |
| 2,479,481 | Eberl et al. | Aug. 16, 1949 |
| 2,607,767 | Vassel | Aug. 19, 1952 |